United States Patent

[11] 3,631,466

[72] Inventors Marvin Masel
West Englewood;
Robert D. Gross, North Caldwell, both of N.J.

[21] Appl. No. 848,476
[22] Filed Aug. 8, 1969
[45] Patented Dec. 28, 1971
[73] Assignee The Singer Company
New York, N.Y.
Continuation-in-part of application Ser. No. 770,166, Oct. 22, 1968. This application Aug. 8, 1969, Ser. No. 848,476

[54] LOW STALENESS ANALOG-TO-DIGITAL CONVERTER
3 Claims, 6 Drawing Figs.

[52] U.S. Cl. .......... 340/347 AD
[51] Int. Cl. .......... H03k 13/02
[50] Field of Search .......... 340/347; 235/150.5, 150.53, 154

[56] References Cited

UNITED STATES PATENTS

| | | | |
|---|---|---|---|
| 3,512,151 | 5/1970 | Finkel et al. | 340/347 |
| 3,277,464 | 10/1966 | Naydan et al. | 340/347 |
| 3,071,324 | 1/1963 | Schroeder | 340/347 |

*Primary Examiner*—Thomas A. Robinson
*Assistant Examiner*—Gary R. Edwards
*Attorneys*—S. A. Giarratana and S. M. Bender

ABSTRACT: Using a digital-to-synchro converter having a sine and cosine side, synchro sine values are fed to the cosine side and synchro cosine values are fed to the sine side of the converter which in effect multiplies the present sine/cosine value by the previous cosine/sine value. The multiplied outputs are compared and any difference serves as the error signal which is fed back to the converter control register to update the register. The various input channels to the converter are multiplexed, fed through the converter onto a hold capacitor. The information temporarily stored on the capacitors is further processed and sequentially used as the input to the control register of the converter means.

INVENTORS:
ROBERT D. GROSS
MARVIN MASEL
BY
[signature]
ATTORNEY

INVENTORS:
ROBERT D. GROSS
MARVIN MASEL
BY
[signature]
ATTORNEY

INVENTORS:
ROBERT D. GROSS
MARVIN MASEL
BY
S. A. Giarratana
ATTORNEY

INVENTORS:
ROBERT D. GROSS
MARVIN MASEL
BY
S. A. Giannatana
ATTORNEY

LOW STALENESS ANALOG-TO-DIGITAL CONVERTER

This application is a continuation-in-part of U.S. Pat. application Ser. No. 770,166 filed Oct. 22, 1968.

BACKGROUND OF THE INVENTION

The present invention relates to multiplexed synchro-to-digital conversion and more particularly to the multiplexing of varying analog information which is provided by a plurality of channels and is converted to digital form representing either sine and cosine values or actual values of shaft angles which are used to supply position information to a computer, e.g., information from several synchros or resolvers logged in a digital computer.

In practice it has been found that several similar systems are often mounted on ships and aircraft. Some systems are used for either stellar or inertial navigation or both, others are used for ship or craft stabilization, others are used for gunnery fire control equipment, etc. The situation just described in effect means considerable duplication of the components described in the Naydan et al. U.S. Pat. No. 3,277,464 and the George F. Schroeder et al. U.S. Pat. No. 3,071,324.

In the light of the above situation, it appears logical to have several separate systems make use of common components. When these components are not used at the same time, this presents no problem. However, when the same component has to be used by two or more systems at the same time, difficulties arise. The work "time" however is a relative work and this must be kept in mind. Thus, gunnery control equipment, ships stabilization equipment and even star trackers operate in relative slow fractions of a second whereas the information obtainable from each separate unit can be scanned in microseconds.

Before describing the present invention, it is constructive to review some of the existing methods of synchro/digital conversion. One of the earliest methods is to follow up the synchro transmitter electromechanically, and drive a shaft encoder (generally at many times speed of the followup synchro). Accuracy of the electromechanical converter is limited by the errors of the control resolver as well as gearing errors between the control resolver and the shaft encoder. One of the useful characteristics of an electromechanical followup servo using synchros is that any harmonics or quadrature generated by the synchro transmitter or control transformer is rejected by the servomotor. This occurs because the torque and speed of the servomotor are approximately proportional to the product of fixed and variable phase voltages. Multiplication of a sine wave of fundamental frequency representing fixed phase excitation by any harmonic components of the variable phase, produces no net DC torque or speed but only ripple components.

In very accurate synchro test equipment, the electromechanical servo is replaced by an array of transformers which can be switched either by transistors or relays. These transformers are rather large and bulky and the method does not lend itself to multiplex operation. Thus, in most airborne applications, this method is not practical. The most widely used method of conversion involves rectifying the sine and cosine voltages for about one-half cycle of the carrier frequency. The resulting DC voltages can be used in a DC to digital converter. In one method, the cosine voltage is used as the voltage reference of a successive approximation converter, and the sine voltage is encoded to obtain the digital tangent, (or cotangent, depending upon the octant of the input angle). In another approach, the sine and cosine voltages are used to start a two-phase oscillator composed of two integrators, and an inverter in a closed loop. The oscillator is then allowed to oscillate while pulses are gated into an angle counter. The count is inhibited after the first zero crossing of the sine or cosine integrator voltages. There are numerous other variations of DC conversion techniques. All of the DC techniques suffer from requiring very close tracking of resistance capacitance products used in converting the AC signal to DC and from drift errors of DC amplifiers. The DC amplifier problem is particularly bad in high-speed successive approximation converters in that fast recovery after each comparison is required. This fast recovery characteristic conflicts with the requirement for low drift.

If instead of a DC system, an AC system is used, an immediate difficulty appears. The AC itself a sinusoidal wave which acts as the carrier of the information. The information itself appears as an envelope of the carrier, essentially, it is the envelope that conveys information and not the carrier. In fact, looking at the carrier at a single instant of time may indeed provide false information since the carrier crosses zero.

Notwithstanding the aforesaid difficulty, the present invention, in contrast with current solid state converters, is an AC rather than DC system. There are no significant errors due to DC amplifier drift, switch offsets, or capacitor instability. Also, the present system utilizes multiplication of the error signal by AC reference, thereby eliminating errors due to harmonic generation in the input synchro resolver. In contrast to the electromechanical and switched transformer methods, the present invention is multiplexable, and can handle a large number, e.g., 10, input synchros. In addition to improvements of accuracy and lower cost, the present invention can provide instant access to a number of synchro channels with staleness of the digital data virtually eliminated. The question of staleness of data is very important with an electromechanical converter; there is a lag between digital output and shaft input because of finite slew rate and response time of the followup servo. Most solid state converters require at least one cycle of carrier frequency (nominally 2.5 milliseconds) for converting each input synchro. A typical coordinate conversion requires at least three probably as many as five input angles. This means that some of the input data is at least 10 milliseconds old. With the present invention, the input information is updated many times per cycle of carrier and the staleness is limited only by the information bandwidth of the synchro carrier. In addition, all input data can be made available in a semiconductor memory and may be read out to the computer at any time. This simply means that the device contemplated therein need not operate synchronously or from the same clock as the digital computer it feeds. Also, the device contemplated herein can also be used with synchro outputs from the digital computer using a multiplexed digital to analog converter.

SUMMARY OF THE INVENTION

Briefly stated, the present invention contemplates making use of a known digital-to-synchro converter means consisting of a sine and cosine side wherein each side has a switch resistor ladder network, i.e., there is a sine resistor ladder network and a cosine resistor ladder network, and, both networks, i.e., the sine and cosine networks are operated by a control register. In the aforementioned Naydan et al. patent, digital information was fed to the control register which in turn would enable resistors in the sine and cosine networks. When a supply voltage was passed across the network, a value corresponding to the sine and cosine of the digital information fed to the control register would be provided on the output side of the networks. In the present invention, the foregoing digital-to-synchro converter means is used "backwards" and instead of passing a supply voltage across the networks, the values corresponding to the sine and cosine of synchro angle on the input side are passed across the network. In the meantime however, there is already within the network sine and cosine values placed therein by the previous action of the control register, i.e., some old sine value on the sine side and some old cosine values on the cosine side. Therefore, in the present invention, the sine information supplied by the synchros on the input side of the network is supplied to the cosine ladder resistor network and the cosine information supplied by the synchros on the input side of the network is supplied to the sine resistor ladder network. Under theoretical or "zero" conditions, the value on the sine side i.e., passing through the sine resistor ladder network should correspond to the value on the cosine side or the cosine resistor ladder network, i.e., new sine multiplied by the old cosine should equal the new cosine multiplied by the sold sine under "null" conditions. If this is not so, i.e., if there is a difference between the sine side and the cosine side, then this difference is the "error" signal. Thus, the output from the sine and cosine networks are summed at a summing station and any difference obtained is then demodulated into DC and controls a counter means. The counter means in turn updates the control register which corrects the value in the network driving the value at the summing station to a null. This arrangement is then the system which will be used by a plurality of synchros on the input side to deposit or temporarily store averaged DC error information on capacitors on the output side of the converter means. The information in each synchro channel will be sequentially extracted by a multiplexing means which will switch the particular synchro channel and its hold capacitor onto the converter. The information in that channel will be processed in the converter means and the error signal is stored on the capacitor on the output side. Then, the multiplexing means will connect the next synchro channel and the next capacitor to the converter means until all synchro channels have been so processed when the programmer which controls the multiplexing means will again connect up the first synchro channel and the first capacitor to the converter means. The information temporarily stored on the capacitor is further processed and sequentially used as the input to control register of the converter means. The output from the control register can be sent to a digital computer which will use the information.

The invention as well as other objects and advantages thereof will become more apparent from the following detailed description when taken in connection with the accompanying drawing, in which:

DETAILED DESCRIPTION

Figure 1:
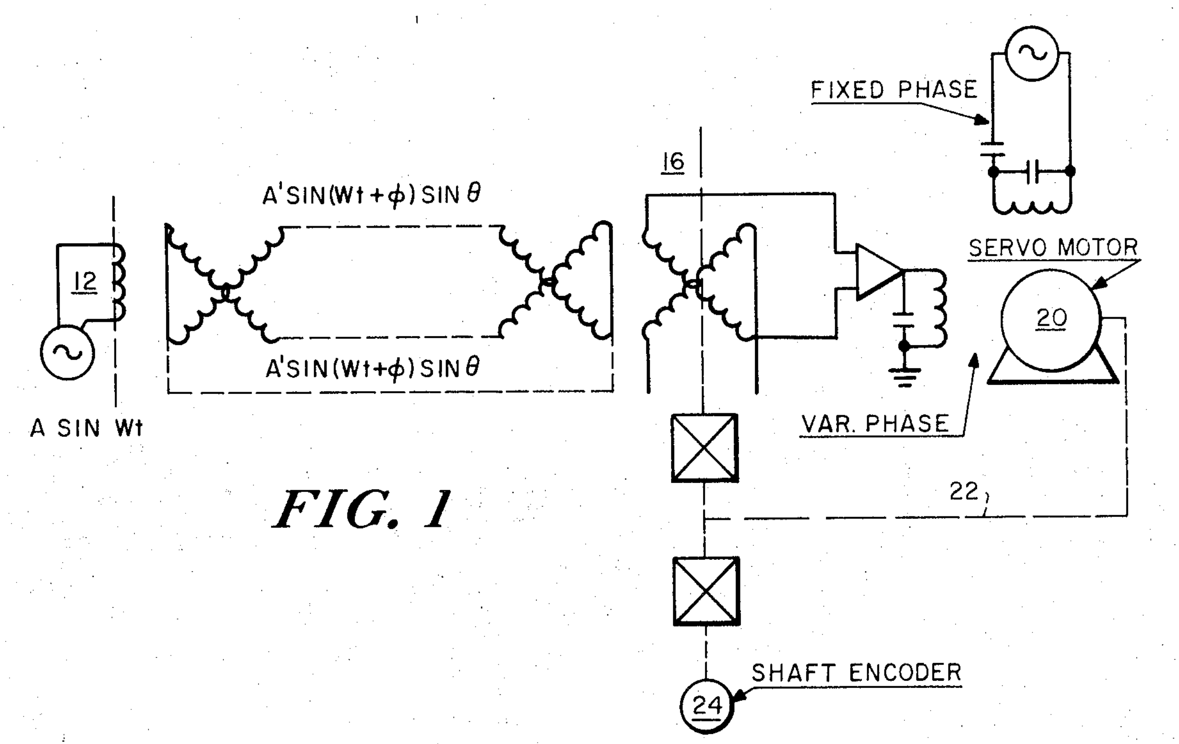
FIG. 1 is a schematic sketch reviewing the theoretical synchro/resolver operation of the prior art.

To understand the operation of the present invention, it is first necessary to look at the prior art system which is shown in FIG. 1. This is a followup type of synchro system. There is a synchro or resolver transmitter 12, providing an input signal to a synchro control transformer 16. If the transmitter moves angularly with respect to the control transformer 16, an error signal develops on the output side of the control transformer driving a servomotor. The servomotor 20 has a feedback loop 22 turning the control transformer rotor 18 so as to reduce the error signal to zero. The angle through which the control transformer 18 turns is provided in digital format by a shaft encoder 24. For the purpose of simplicity, four-wire resolvers are shown in FIG. 1. However, the same principal applies to three-wire synchros since Scott-T transformers can be used to convert three wire to four wire information or vice versa.

As is readily apparent, from an examination of FIG. 1 and the foregoing description, the system described is bulky, and relies on a motor and gearing which in itself is rather heavy. The present invention will perform exactly the same function as FIG. 1 without motor, gearing or bulky moving parts. Furthermore, this will be done by multiplexing a plurality of input channels supplying information to a computer.

A prior art feature which must be borne in mind in the present invention is the teachings of the B. N. Naydan et al. U.S. Pat. No. 3,277,464, and shown in FIG. 2 and 3 as converter means 100.

Figure 2:
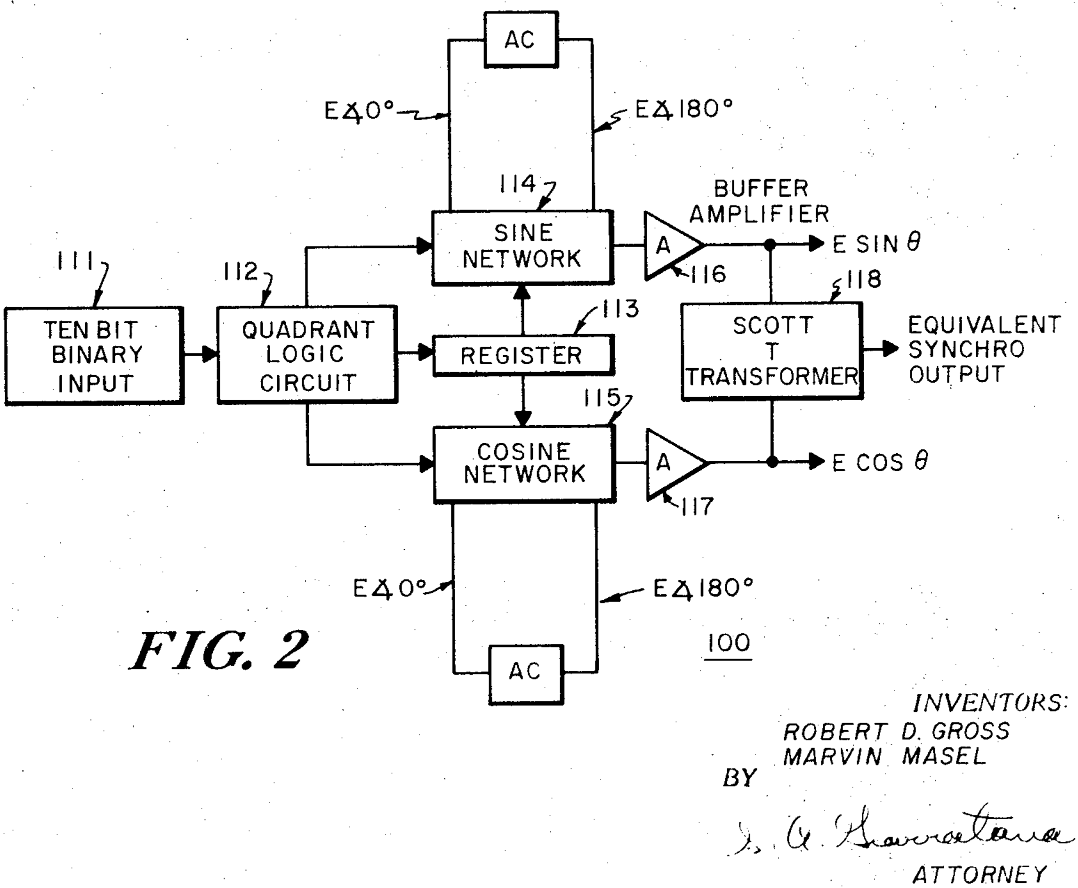
FIG. 2 shows a block diagram of a digital-to-synchro converter system of the prior art and describe in the Bob N. Naydan et al. U.S. Pat. No. 3,277,464.

The B. N. Naydan et al. U.S. Pat. No. 3,277,464 e.g., converter means 100 shown in FIG. 2 provides for an arrangement for converting a binary digital input corresponding to an angle into a sinusoidal function of the angle. The digital input is first fed into logic means 112 where the inputs corresponding to 90° and 180° determine the phase of the power supply and the values supplied as the sine and cosine. The logic means 112 control the values and power phase passing through a sine network 114, a cosine network 115 and to a register 113. Base sine and cosine values are supplied by a parallel base resistor network 101 responsive to the register 113. This network has a binary ladder of base parallel resistors to supply base sinusoidal values in response to flip-flop signals from the register corresponding to angles 11.25°, 22.50°, 45° and 90°.

Intermediate angle values are supplied by a correction network having correction resistors. These correction resistors are enabled into the correction network by a plurality of gating circuits. Responsive to the register 113 is also a fine resistor network 104 also augmented in the binary system to supply fine values between succeeding base resistor values by an attenuation register network 103 having a plurality of attenuation resistors determine the slope of the sinusoidal curve. The particular attenuator resistor in the network is determined by a logic arrangement of gating circuits.

The sine and cosine networks are identical except that the cosine has one additional resistor in the fine networks of a value corresponding to the least significant bit in the network. These two networks are enabled by opposite sides of the register flip-flops.

The sine and cosine outputs of both networks are then fed to buffer amplifiers, the output value of which corresponds to the sine and cosine values of the input angle value. To simulate a synchro these sine and cosine values must then be fed to a Scott-T type of transformer device. Thus, the output of the cosine network 115 is fed to buffer amplifier 117 and the output of the sine network 114 is fed to sine buffer amplifier 116 where it is attenuated by 0.5 and summed with the output of the cosine network attenuated by the 3/2. The resultant outputs from sine buffer amplifier 116 and cosine buffer amplifier 117 are fed to two separate transformer primaries. These two primaries both feed a center tapped secondary.

Figure 3:
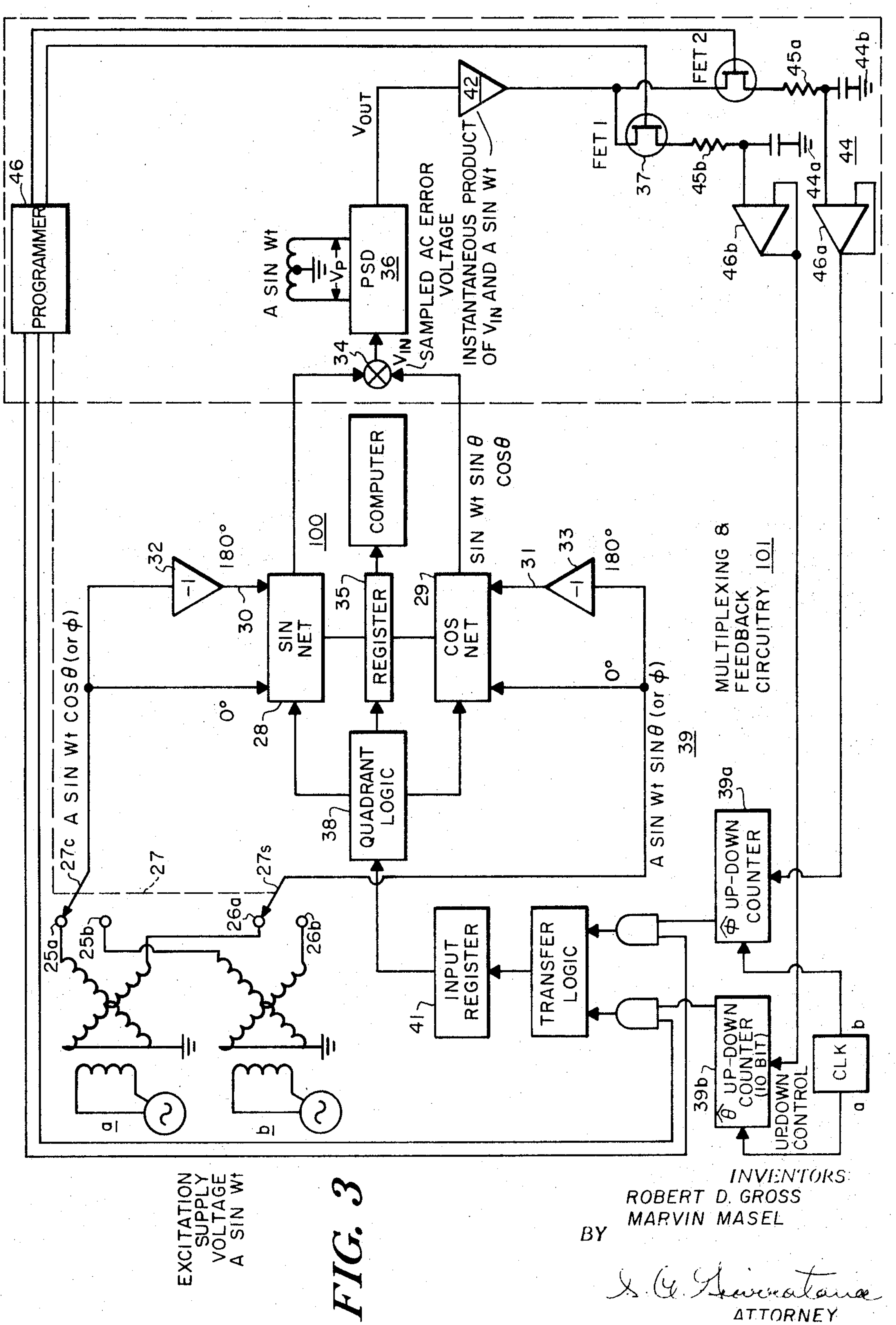
FIG. 3 presents a block diagram of a multiplexed syncrho-to-digital converter herein contemplated but using as one of its components the aforementioned converter of FIG. 2.

A synchro-to-digital converter herein contemplated using computer means 100 is shown in FIG. 3. The similarity between FIGS. 1 and 2 and FIG. 3 should be noted, as well as the differences. Thus, the arrangement described in FIG. 2 is to be used in connection with multiplexing a plurality of units performing the function of the device of FIG. 1.

On the input side of FIG. 3 are a plurality of synchro channels *a* and *b* respectively supplying angular information. Each channel has a sine connection 25*a*, 25*b* and cosine connection 26*a*, 26*b*. These channels in turn will provide a signal to an input multiplexer switch 27. The input multiplexer switch 27 has a cosine section 27*c* and a sine section 27*s* and will in turn serve as the input to a sine network 28 and a cosine network 29 of a converter. These networks 28 and 29 have been carefully described in the aforementioned Bob N. Naydan et al. patent, and essentially consist of a coarse network, providing values between 0°, 11 ¼°, 22 ½°, 45° and 90°, a correction network providing values of 33 ¾° and 56 ¼° which receive a voltage 180° out of phase with the input to the coarse network and, there is also a fine network in the binary scale.

There are differences however between the aforesaid system described in the Bob N. Naydan patent and the present system. The present invention relates to a converter which is "going the other way," i.e., from a synchro value or sine/cosine, to a digital value. Therefore, in the Bob N. Naydan et al. patent, the 10-bit binary input 111 was fed to the quadrant logic 112 and then to the register 113 which would act on the sine and cosine resistor networks 114, 115 to provide an analog value on the output side corresponding to the sine/cosine value on the input side while he resistor networks on the sine and cosine side each receive an AC supply voltage as shown in FIG. 2.

When, as in the present invention, the information flow is "the other way," i.e., from analog to digital, the circuitry flow is somewhat "reversed." The signal takes the place of the AC supply voltage so that from the input multiplexer switch 27 the signal is fed to the sine and cosine networks 28, 29, one section 30, 31 going to the correction network through inverter 32, 33.

This simply means that for an instant in time, the value within the register 35, whatever that value may be will be multiplied by the sine/cosine. The particular value in the register 35 at this instant in time is completely immaterial since the system is a feedback system and the value within the register will rapidly "straighten itself out" to correspond to the true sine/cosine value that is is supposed to represent. Thus, at any particular instant in time, the input multiplexer switch 27 is sampling synchro 26a providing information on angle $\theta$, the output from the sine network can be expressed as A sin wt. cos $\theta$ sin $\hat{\theta}$, the corresponding output from the cosine network can be expressed as A sin wt. Sin $\theta$ cos $\hat{\theta}$, where A is the supply or excitation value of the network. $\theta$ is the particular instantaneous angle of the synchro. $\hat{\theta}$ is the estimated value of $\theta$. From the sine and cosine networks, the outputs go to a summing station 34. At this station the following mathematical result is produced:

$$A \sin wt. \cos \theta \sin \hat{\theta} - A \sin wt \sin \theta \cos \hat{\theta} \approx 0$$

it is quite obvious that under ideal or "true" conditions, the output from summing station 34 should be zero. Deviation from zero corresponds to the so-called "error signal" of the servo loop as previously mentioned in connection with the description of the present day synchros shown in FIG. 1.

Since an understanding of the situation described is sometimes not so simple, and this is one of the key features of the network, it is essential to dwell upon this summing point 34 somewhat.

At the present stage of the explanation, there is as yet no multiplexing, and the system described has been described as if it were a single channel system. Assume that the previous signal in the angle is $\theta$, and that the situation has not changed so that the present value on the input side is also angle $\theta$. One switch "arm" 27a of the multiplexer 27 (in practice there is of course no "arm" since the switching is solid state) is connected to the cosine side of synchro 26a, i.e., 26a-1. Therefore fed into the sine resistor network 28 is a cosine value. This value however is multiplied by the previous sine value of the sine network 28 which was placed into the network by the register 35. Therefore, effectively, the cosine of the instant input signal cos $\theta$ is multiplied by the sine of the previous signal which in this case would be sin $\hat{\theta}$ and these in turn are multiplied by the reference signal. The same situation takes place on the cosine network side, i.e. in the cosine resistor network so that when the two outputs are subtracted in the summing station 34, the result would be zero. Once, the input synchro 26a turns from the zero condition, then the value in the register no longer can null out the input and an unbalance error signal is generated. Therefore, the situation just described is quite similar to the theoretical old fashioned electromechanical servo shown in FIG. 1. Again, omitting the problem of multiplexing for the time being, two problems remain. First, an operation corresponding to the motor and gearing of FIG. 1 but done in solid state must "turn" the register back to the null position so as to reestablish the balance and, this amount of "turning" has to be counted and provided in a form which can be digested by a computer.

Figure 4:
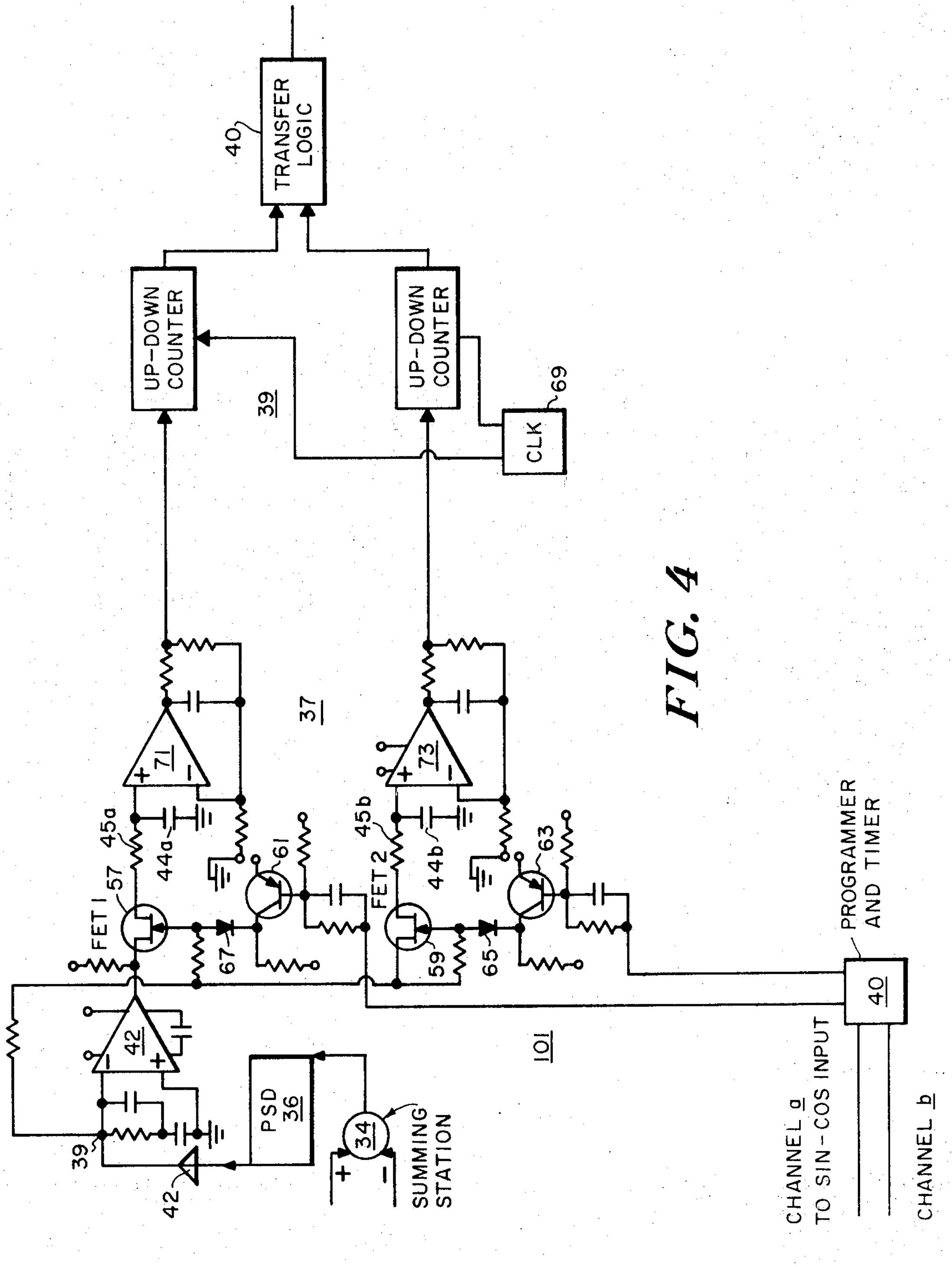
FIG. 4 illustrates in block diagram and schematic form the multiplexing arrangement contemplated herein.

Looking at FIG. 4, it is shown that the output from summing station 34 goes to a phase-sensitive demodulator 36, a multiplexer switch 37 and up-down counter means 39. For the moment, to simplify the understanding of the description, a description of multiplexing is omitted, and the system is to be considered as a single channel system. Also, for the moment, it is preferable to skip over the description of the phase-sensitive demodulator 36 and the multiplexing switch 37.

The output from the summing station 34, after phase-sensitive demodulation determines the value and polarity of the count of up-down counter means 39. From up-down counter means 39 the digital angle is gated to transfer logic 40 by an AND gate and transferred by transfer logic 40 to an input register 41 serving as the cycled input. The cycled input fed to the quadrant logic 38 illustrated in FIG. 3 and described in length in the aforesaid B. N. Naydan et al. U.S. Pat. (as well as the George F. Schroeder et al. U.S. Pat. No. 3,071,324). Therefore, again for the purpose of understanding the present invention, the angles provided by the synchro or resolver input can be considered to be in the first quadrant. From the quadrant logic, the input signal is applied to the control register to update the control register which in turn acts on the proper resistors in the sine and cosine networks to place the corrected sine and cosine into the respective networks. In this way, the error signal leaving summing station 34 is recycled back to update the control register.

It is again important to emphasize at this point that an existing unit, namely the circuitry described in the aforementioned B. N. Naydan et al. patent has been used in its identical form with the exception that the input signal is fed to the unit in the place of the power supply, i.e., at the place where the power was fed to the B. N. Naydan et al. unit. Furthermore, the sine value obtained from a synchro or resolver is fed to the cosine side of the unit whereas the cosine value obtained from a synchro or resolver is fed to the sine side of the unit. The result of the foregoing action means that the instantaneous sine and cosine values supplied by the synchro/resolver input are multiplied by the previous cosine and sine values already in the network so that under "zero" or "identical" conditions from the previous "reading," the value on one side of the network, e.g., the sine side should equal the value on the other side of the unit, e.g., the cosine side. Whenever the synchro/resolver providing the input signals turn off the established null point, the two sides i.e., the two networks are no longer equal and the difference provided at summing station 34 is the error signal which is then cycled back to the control register to again create a null situation.

It is now necessary to go back in the description to the summing station 34 which is providing an error signal, as shown in FIG. 4. The error signal is fed to the phase-sensitive demodulator 36. The phase-sensitive demodulator used herein has been described by James N. Giles "Fairchild Semiconductor Linear Integrated Circuits Application Handbook," Library of Congress Catalog Number 67-27446, pages 154, 155 (article by C. J. Amato of Lear Siegler, Inc., Cleveland, Ohio entitled "Transforerless Modulator-Demodulator"). Suffice it to say therefore, in the light of the explanation given in the foregoing Fairchild handbook, that the error signal in AC form is changed to a DC voltage corresponding to the product of the error signal and the excitation voltage. This is shown in FIG. 3 which shows an excitation or supply voltage which is the same as the excitation or supply voltages of the syncrhos 26a, 26b, namely A sin wt. This voltage is fed to the phase-sensitive demodulator which also processes the error signal shown as Error.

Therefore an electronic phase-sensitive demodulator 36 replaces the action of the servo motor in multiplying a variable phase by a fixed phase reference. The phase-sensitive demodulator output serves to charge up one of a number of filter capacitors 44 having a resistor in series therewith a time constant of the order of one of two cycles of carrier. The filter capacitors in this case are not really sample and hold capacitors, as would be the case if resistors 45a and 45b, were omitted. Every 10 microseconds a new error signal representing a different input signal is presented to the phase-sensitive demodulator. The filter capacitor voltage then represents the average product of error signal with reference to a fairly large number of samples. The polarity of the demodulated and filtered error signal provided by the phase-sensitive demodulator determines the direction of count of the appropriate up-down counter, 39a or 39b. The updated estimate of shaft position is then fed to a computer and estimated shaft angle of another synchro is then extracted from another up-down counter for the next operation.

As pointed out initially, the present invention relates particularly to the multiplexing of several channels of information. It is therefore necessary to rapidly scan the inputs of the synchro channels *a* and *b* (each channel being sampled many times per cycle of carrier frequency), and average the resulting error voltages on the respective capacitors 44. The resistors 44a and 44b are selected to provide a filter time constant of at least one cycle of carrier frequency. The capacitor voltages are buffered by buffer amplifiers 46a, 46b. The voltage polarities determine the direction of count of up-down counters 39. On the output side of converter 100 is located multiplexing and feedback circuitry 100. The analog outputs from the summing station 34, after passing through phase-sensitive demodulator 36 are amplified in an amplifier 42. Effectively, at this point the signal from the converter means 100 is amplified DC voltage. This DC voltage must be fed across either switch FET 1 or FET 2 as selected by the programmer 46 and averaged by capacitors 44a and 44b.

The programmer 46 must provide six outputs:

first—to the first channel error signal-output switch FET 1;
second—to the sine and cosine switches 27s, 27c to act on the first channel;
third—as a gating pulse to the first channel up-down counter output selection gate;
fourth—to the sine and cosine switches 27s, 27c to act on the second channel;
fifth—as a gating pulse to the second channel up-down counter output selection gate;
sixth—to the second channel error signal output switch FET 2.

an example of circuitry used for sampling and buffering the error signal is shown in FIG. 4.

The objective is to sample the value supplied for angles in the *a* channel and the *b* channel. This sampling goes on continuously switching from the *a* channel to the *b* channel, etc. The value sensed is constantly changing AC To properly carry out this sampling, the settling time of the system is taken into account.

Figure 5:
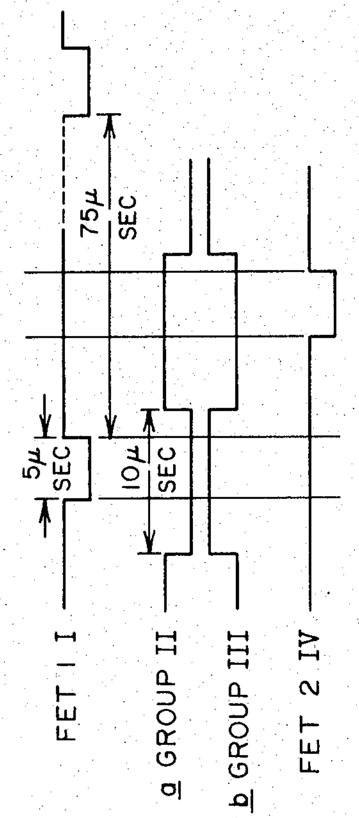
FIG. 5 graphically illustrates the timing sequence used herein.

Therefore, each sampling is done during a period of 5 microseconds in a 10-microsecond time period. The switching from one group to the other is offset and does not take place immediately. This is shown in FIG. 5 where the *a* group gates or switches of FIG. 3, i.e., AND gates are enabled for 10 microseconds on the input side but the FET 1 switch on the output side is only enabled for a 5-microsecond period well within the 10-microsecond period. Likewise when the *b* group gates or switches are transmitting, the switch FET 2 is only open for a part of the time.

Figure 6:
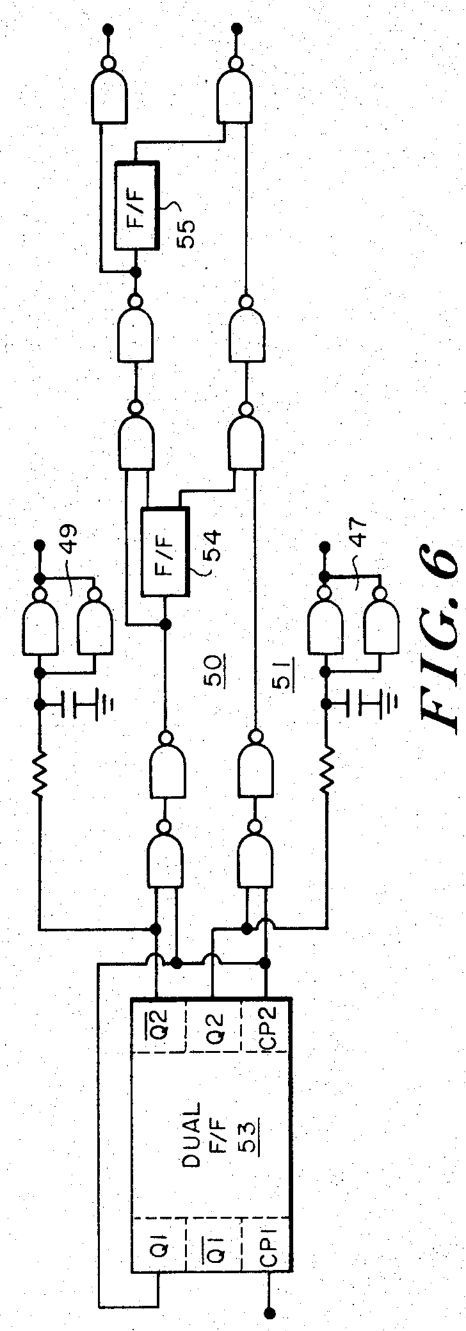
FIG. 6 provides a block diagram explanation of the timing or programmer logic used herein.

Thus, referring to FIG. 6 the programmer contains a dual flip-flop 53 on the input side. Dual flip-flop 53 has four outputs which are changed by a clock pulse supplied by a clock pulse source. Clock pulse 1 acts on the Q1 and $\overline{Q1}$ side. Clock pulse 2 acts on the Q2 and $\overline{Q2}$ side. Q2 and $\overline{Q2}$ will supply an output II and III to group *a* and *b* in opposite phase by means of inverter gates 47 and 49.

Outputs I and IV must be supplied to FET 1 and FET 2 with the time lag. This is accomplished by using two flip-flops 54 and 55 and a set of inverters 50, 51 to properly enable the flip-flops to provide the desired outputs.

As a result of the action of the clock circuits, switches FET 1 and FET 2 will open for one-half of the time that the group *a* gates are passing information. As shown in FIG. 4, these switches, FET 1 and FET 2, consist of one FET transistor 57, 59 a driver transistor 61, 63 acting on the base of the FET transistors across a diode 65, 67. The clock circuit outputs act on the bases of the driver transistors which in turn act on the FET transistors. The output from switches FET 1 and FET 2 are filtered and stored in a filter capacitor 44a, 44b having a filter resistor 45a, 45b.

The outputs of capacitors 44a and 44b are next fed to the up-down counters 39a, 39b (where the capacitor voltage polarity determines direction of count) and from the up-down counters 39a, 39b the output is gated to transfer logic 40. The transfer from the up-down counters 39a, 39b to the transfer logic 40 is controlled by the programmer 40 which supplies pulses to the output gates of up-down counters 39a, 39b.

It is observed therefore that the present invention provides for a multiplexing arrangement used in an analog to digital converter which has an input side wherein an analog value as a voltage is fed to the converter, an output side, and switch resistor ladder network means connected between said sides. A control register is connected to operate and control the ladder network means so as to enable therein resistors corresponding to a digital network value, and forming a circuit tending to cancel the input voltage analog value. A summing station circuit tending is on said output side and provides error value which is the difference between the voltage analog value and the digital network value. A feedback loop from the summing station circuit to said control register supplies the control register with said error value in digital form to up-date the control register. According to the invention concept hereinbefore described, there is on said input side, a plurality of channels, each channel serving to feed a different analog value as voltage. On said output side, there is a phase-sensitive demodulator connected to said summing station. A plurality of storage and filter capacitors are disposed for connection to said phase-sensitive demodulator. A plurality of up-down counters are connected to each of said storage capacitors, another are transfer means to transfer the information in the up-down counters to the control register. First switch means are interposed between each of said channels and said converter on the input side and second switch means are interposed between said capacitors and said phase-sensitive demodulator. Also there is a programmer means to sequentially feed the analog voltage values from each of said channels across the network means and feed said error value onto the corresponding storage and filter capacitor, and to pass said error value stored on said capacitor onto said up-down counters.

We claim:

1. In an analog to digital converter including an input side wherein an analog value as a voltage is fed to the converter, an output side, switch resistor ladder network means connected between said sides, a control register connected to operate and control said network means so as to enable therein resistors corresponding to a digital network value, and forming a circuit tending to cancel said voltage analog value, a summing station circuit on said output side providing an error value which is the difference between said voltage analog value and said digital network value, and, a feedback loop from said summing station circuit to said control register supplying said control register with said error value in digital form to update said control register, the improvement therein comprising in combination:

a. on said input side, a plurality of channels, each channel serving to feed a different analog value as voltage;
b. on said output side, a phase-sensitive demodulator connected to said summing station;
c. a plurality of storage and filter capacitor means disposed for connection to said phase-sensitive demodulator corresponding in numbers to said channels;
d. a plurality of up-down counters, one connected to each of said storage capacitor means, transfer means to transfer the information in said up-down counters to said control register;
e. first switch means interposed between each of said channels and said converter input side and second switch means interposed between said storage capacitor means and said phase-sensitive demodulator, to sequentially feed said analog voltage values from each of said channels across said network means and to feed said error value onto the corresponding storage and filter capacitor means, and to pass said error value stored on said storage capacitor onto said up-down counters.

2. A device as claimed in claim 1 wherein said channels each include synchro means having a sine and cosine section representing angular information, said converter having sine and cosine sides, and circuits connecting the synchro means sine section to said cosine side and said synchro means cosine return to said sine side.

3. The device claimed in claim 2 wherein said programmer means includes a logic circuitry including first means acting on said first switch means for a predetermined time period and second time means acting on said second switch means for a second, shorter time interval, said second time period taking place towards the center portion of said longer time period.

* * * * *